(12) United States Patent
Rudy et al.

(10) Patent No.: US 7,410,299 B2
(45) Date of Patent: Aug. 12, 2008

(54) LINEAR ROLLING BEARING

(75) Inventors: Dietmar Rudy, Kleinbundenbach (DE); Bettina Rudy, Kleinbundenbach (DE)

(73) Assignee: Schaeffler KG (DE)

( * ) Notice: Subject to any disclaimer, the term of this patent is extended or adjusted under 35 U.S.C. 154(b) by 344 days.

(21) Appl. No.: 11/381,416

(22) Filed: May 3, 2006

(65) Prior Publication Data

US 2007/0098309 A1    May 3, 2007

(30) Foreign Application Priority Data

May 4, 2005    (DE) .................. 10 2005 020 811

(51) Int. Cl.
*F16C 29/06*    (2006.01)
(52) U.S. Cl. .......................... 384/8; 384/45
(58) Field of Classification Search ............. 384/8, 384/43–45
See application file for complete search history.

(56) References Cited

U.S. PATENT DOCUMENTS

| 6,174,084 | B1 | 1/2001 | Pauwels | |
| 6,584,887 | B1 * | 7/2003 | Poeschl | 92/88 |
| 6,848,326 | B2 * | 2/2005 | Akiyama et al. | 384/43 |
| 7,178,981 | B2 * | 2/2007 | Rudy et al. | 384/8 |

FOREIGN PATENT DOCUMENTS

| DE | 103 07 882 A1 | 9/2004 |
| EP | 1 502 700 A1 | 2/2005 |

\* cited by examiner

*Primary Examiner*—Thomas R Hannon
(74) *Attorney, Agent, or Firm*—Lucas & Mercanti, LLP

(57) ABSTRACT

A linear rolling bearing, having an approximately U-shaped guide carriage (2) which is arranged on a guide rail (1) and has two limbs (3) and a spine (4) which connects the two limbs (3), the two limbs (3) of the guide carriage (2) engaging around the guide rail (1), and rolling bodies rolling on raceways (5, 6) of the guide carriage (2) and of the guide rail (1) under preload, the raceways (5, 6) being formed on sides, which face one another, of the guide rail (1) and of the two limbs (3), and at least one sensor (9) being attached to the guide carriage (2), the sensor (9), which is embodied as a strain gauge (8), being attached centrally between the two limbs (3) to that side of the spine (4) of the guide carriage (2) which faces the guide rail (1).

4 Claims, 1 Drawing Sheet

LINEAR ROLLING BEARING

Figure 1:
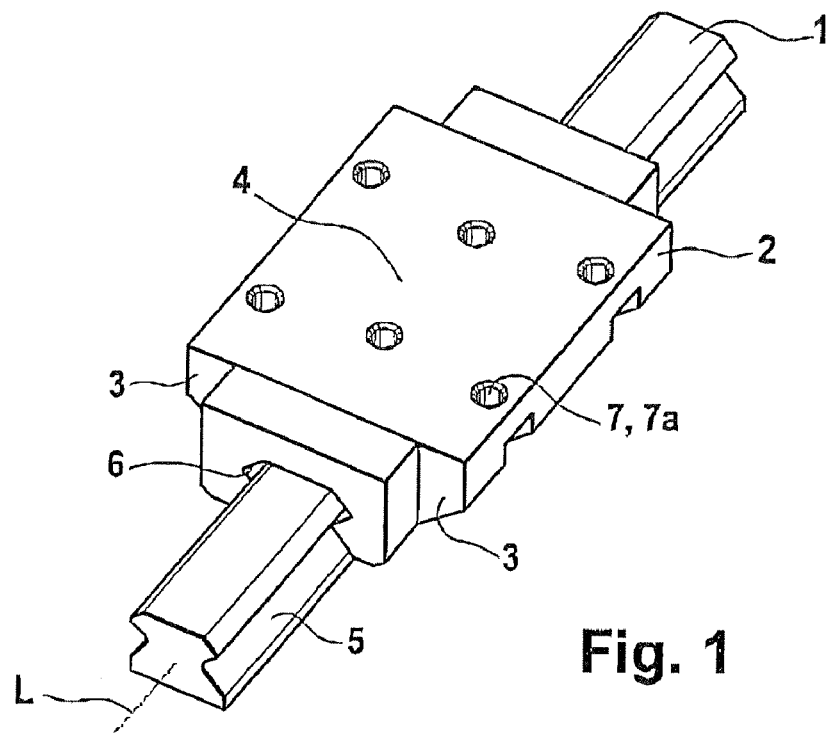

The present invention relates to a linear rolling bearing having an approximately U-shaped guide carriage which is arranged in a longitudinally displaceable manner on a guide rail.

By way of example, EP 1 502 700 A1 has disclosed a linear rolling bearing in which an approximately U-shaped guide carriage is arranged in a longitudinally displaceable manner on a guide rail. The guide carriage substantially has two limbs and a spine which connects the two limbs, the two limbs of the guide carriage engaging around the guide rail. Rolling bodies roll on raceways of the guide carriage and of the guide rail under preload, the raceways being formed on sides, which face one another, of the guide rail and of the two limbs. In order to be better able to inspect the state of the linear rolling bearing, sensors are attached to the outside of the two limbs of the guide carriage, which sensors are formed by a strain gauge. Said sensors measure deformations of the guide carriage which are caused by forces acting on the guide carriage.

Normally, the rolling bodies roll on the raceways under preload. If said preload decreases on account of wear of the raceways or of the rolling bodies, this decrease in preload also results in elastic deformation of the guide carriage. This deformation can also be measured by the strain gauges. Said sensors are connected to an evaluation unit. The deformation, which is transmitted as a measurement signal to the evaluation unit by the sensor, can be utilized further in the evaluation unit. By way of example, a fault message can be output if increased wear of the linear rolling bearing is detected.

Forces can act on linear rolling bearings of said type from different directions. In EP 1 502 700 A1, a multiplicity of sensors are provided in order to measure the deformations caused by the forces, the measurement signals of which sensors are fed via a pre-amplifier into an analog/digital converter of an evaluation unit. A total of four measurement signals are accordingly evaluated in order to ultimately obtain a statement regarding the state of the linear rolling bearing.

It is an object of the present invention to specify a linear rolling bearing in accordance with the features of the preamble of claim 1, in which the state of the linear rolling bearing is detected in a simplified manner.

According to the invention, this object is achieved in that the sensor, which is embodied as a strain gauge, is attached centrally between the two limbs to that side of the spine of the guide carriage which faces the guide rail. This location is proportional to the internal equivalent bearing loading. This means that all forces acting on the linear rolling bearing can be converted to an equivalent bearing loading at this location which is provided according to the invention. According to the invention, instead of a multiplicity of sensors for assessing the forces acting on the linear rolling bearing, one sensor alone can be sufficient to draw conclusions regarding the preload and wear on the linear rolling bearing. However, a maximum of two sensors which are both arranged centrally between the limbs and at a distance to one another can also be particularly favorable. For two sensors, a bridge circuit can be provided which makes particularly good measurement values possible. The measurement point proposed according to the invention for the strain gauge also provides a linear signal as a function of the equivalent bearing loading, which can be advantageous for representation of the wear or preload.

Normally, the spine of the guide carriage is provided with passage openings, for example for fastening a machine part. By way of example, a tool or another machine part can be flange-mounted on the spine. It was established that the measurement signals transmitted by the sensor permit more exact statements to be made regarding the bearing loading the closer the sensor is arranged to the passage opening. One embodiment according to the invention therefore provides that the strain gauge is arranged in the immediate vicinity of the passage opening.

The smallest distance between the strain gauge and the passage opening is preferably greater than or equal to zero and smaller than the opening width of the passage opening. Within this range highly exact statements can be made regarding the bearing loading on the basis of the transmitted measurement signals.

Figure 2:
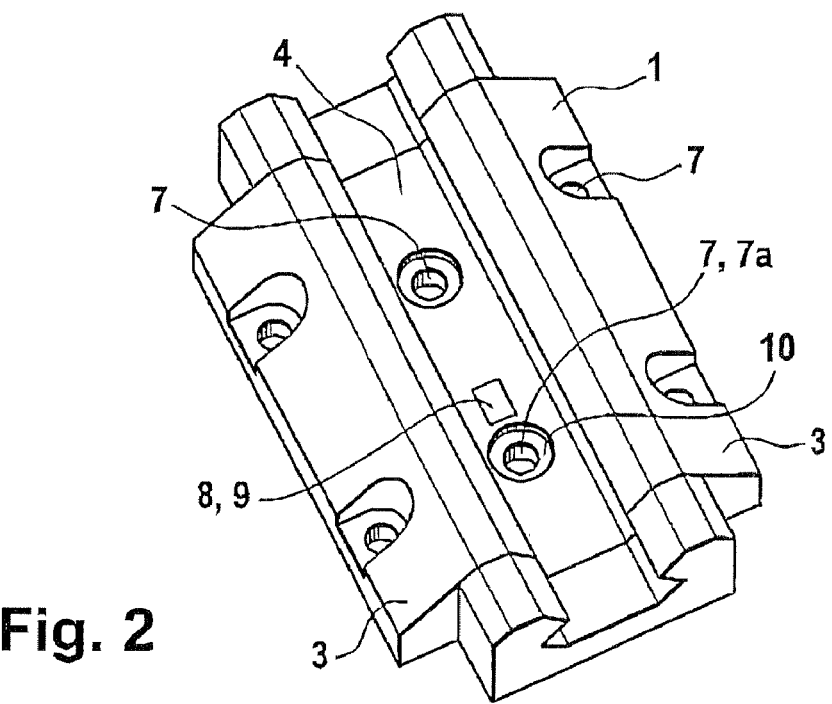

In the following, the invention is explained in more detail on the basis of an exemplary embodiment which is depicted in two figures, in which:

FIG. 1 shows a linear rolling bearing according to the invention in a perspective illustration and FIG. 2 shows the guide carriage of the linear rolling bearing from FIG. 1 in a perspective illustration.

The linear rolling bearing according to the invention depicted in FIG. 1 has a guide carriage 2 which is arranged in a longitudinally displaceable manner on a guide rail 1. The guide carriage 2 substantially has two limbs 3 and a spine 4 which connects the two limbs 3. The two limbs of the guide carriage 2 engage around the guide rail 1. Rolling bodies, which are not depicted in more detail here, roll on raceways 5, 6 of the guide carriage 1 and of the guide rail 2 under preload in a known manner. The raceways 5, 6 are formed on sides, which face one another, of the guide rail 1 and of the two limbs 3.

The spine 4 of the guide carriage 2 is provided with a multiplicity of passage openings 7 embodied as bores 7a. Two of said passage openings 7 are situated centrally above the longitudinal axis L of the guide rail 1. These two passage openings 7 are also situated centrally between the two limbs 3 of the guide carriage 2.

It can be seen in FIG. 2 that a sensor, which is embodied as a strain gauge 8, is attached to that side of the spine 4 which faces the guide rail 1. Said strain gauge 8 can, for example, be adhesively bonded. This strain gauge is likewise connected, as in the exemplary embodiment of EP 1 502 700 A1, via an amplifier and an analog/digital converter to an evaluation unit. These components are not described in any more detail here.

The strain gauge 8 is situated centrally between the two limbs 3 of the guide carriage 2 and centrally above the longitudinal axis L of the guide rail 1. Forces acting on the guide carriage 2—as tensile or compressive forces perpendicular to the spine 4, or as transverse forces—can be specified as an equivalent bearing loading acting centrally between the two limbs 3 of the guide carriage 2 and perpendicularly with respect to the longitudinal axis L of the guide rail 1. Elastic deformation of the guide carriage 2 on account of the forces acting results in deformation of the spine at the measurement point, giving a linear relationship between the measurement signal of the strain gauge and the equivalent bearing loading.

If the internal preload in the linear rolling bearing according to the invention decreases on account of advanced wear of the raceways 5, 6 or of the rolling bodies (not depicted here), the elastic deformation of the guide carriage 2 also decreases, as a result of which the strain gauge 8 outputs a changed measurement signal. If the preload lies outside a predefined tolerance range, an error message, for example, can be triggered at a corresponding measurement signal.

If, on account of dirt accumulation, the displacement force required to displace—the guide carriage 2 along the guide rail 1 increases, elastic deformation of the guide carriage 2 can result on account of this increased displacement force. In this situation, a changed measurement signal from the strain gauge 8 also results.

In the linear rolling bearing according to the invention, one strain gauge provided at the location proposed according to the invention can be used to make a statement regarding the bearing loading and thus regarding the state of the linear rolling bearing.

It can be seen in FIG. 2 that the strain gauge 8 is arranged in the immediate vicinity of the passage opening 7. Here, this passage opening is provided as a bore 7a with a countersunk hole 10 for holding a screw head (not illustrated here). The distance between the edge of the countersunk hole 10 and the edge of the strain gauge 8 is greater than or equal to zero and less than the diameter of the countersunk hole 10. When the strain gauge 8 is in the immediate vicinity of the passage opening 7, there is a good linear relationship between the equivalent bearing loading and the measurement signal.

The exemplary embodiment described here can be modified. A modified solution according to the invention is comprised in that two sensors 9 are arranged near the two bores 7a, one sensor 9 between each face end of the guide carriage and the respective nearest bore 7a. In this case, no sensor is provided between the bores 7a.

LIST OF REFERENCE DESIGNATIONS

1 Guide rail
2 Guide carriage
3 Limb
4 Spine
5 Raceway
6 Raceway
7 Passage opening
7a Bore
8 Strain gauge
9 Sensor
10 Countersunk hole

The invention claimed is:

1. Linear rolling bearing, having an approximately U-shaped guide carriage (2) which is arranged on a guide rail (1) and has two limbs (3) and a spine (4) which connects the two limbs (3), the two limbs (3) of the guide carriage (2) engaging around the guide rail (1), and rolling bodies rolling on raceways (5, 6) of the guide carriage (2) and of the guide rail (1) under preload, the raceways (5, 6) being formed on sides, which face one another, of the guide rail (1) and of the two limbs (3), and at least one sensor (9) being attached to the guide carriage (2), characterized in that the sensor (9), which is embodied as a strain gauge (8), is attached centrally between the two limbs (3) to that side of the spine (4) of the guide carriage (2) which faces the guide rail (1).

2. Linear rolling bearing according to claim 1, in which the spine (4) is provided with at least one passage opening (7), the strain gauge (8) being arranged in the immediate vicinity of the passage opening (7).

3. Linear rolling bearing according to claim 2, in which the smallest distance between the strain gauge (8) and the passage opening (7) is greater than or equal to zero and smaller than the opening width of the passage opening (7).

4. Linear rolling bearing according to claim 1, in which the passage opening (7) is arranged centrally between the two limbs (3).

* * * * *